No. 813,375. PATENTED FEB. 20, 1906.
J. J. GLAUSER.
ICE CREAM MACHINE.
APPLICATION FILED FEB. 25, 1905.
2 SHEETS—SHEET 1.
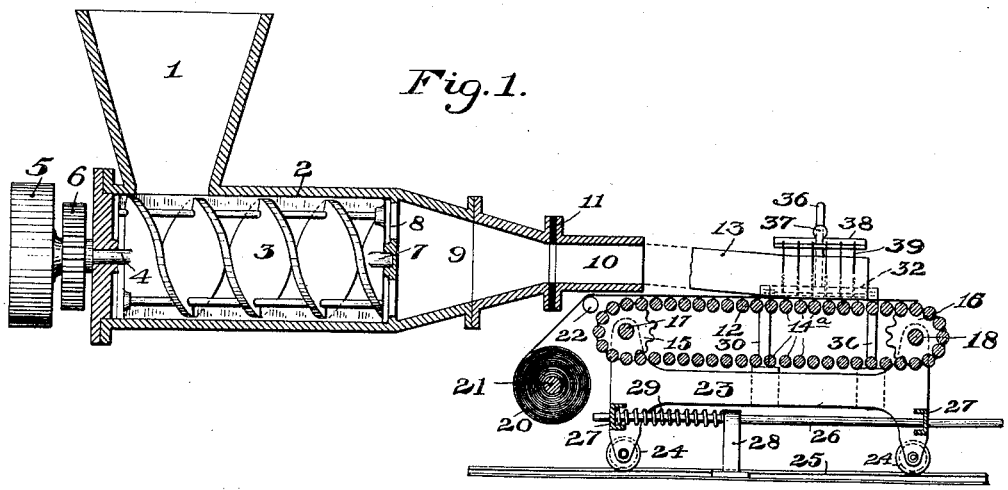
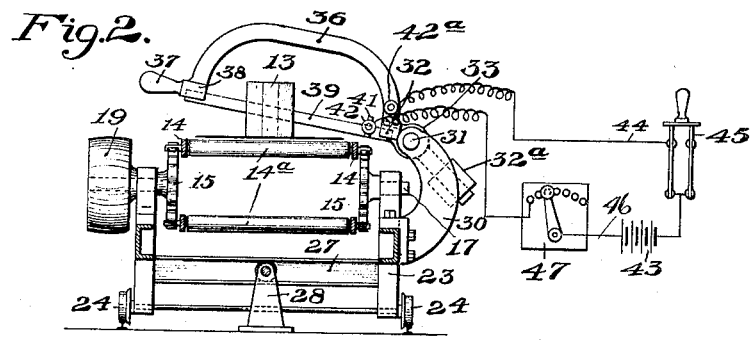
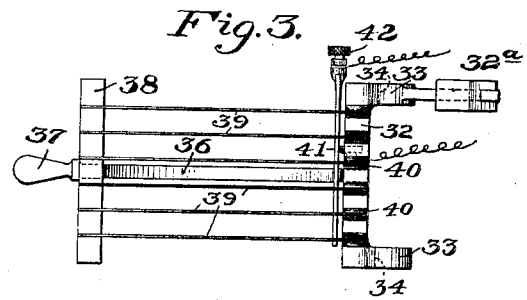
WITNESSES
INVENTOR
John J. Glauser
by Edward A. Laurence
his attorney.

No. 813,375. PATENTED FEB. 20, 1906.
J. J. GLAUSER.
ICE CREAM MACHINE.
APPLICATION FILED FEB. 25, 1905.

2 SHEETS—SHEET 2.

WITNESSES

INVENTOR

UNITED STATES PATENT OFFICE.

JOHN J. GLAUSER, OF PITTSBURG, PENNSYLVANIA, ASSIGNOR TO THE EDWARD E. RIECK COMPANY, OF PITTSBURG, PENNSYLVANIA, A CORPORATION OF PENNSYLVANIA.

ICE-CREAM MACHINE.

No. 813,375. Specification of Letters Patent. Patented Feb. 20, 1906.

Application filed February 25, 1905. Serial No. 247,218.

*To all whom it may concern:*

Be it known that I, JOHN J. GLAUSER, a citizen of the United States, residing at Pittsburg, in the county of Allegheny and State of Pennsylvania, have invented or discovered new and useful Improvements in Ice-Cream Machines, of which the following is a specification.

Figure 4:
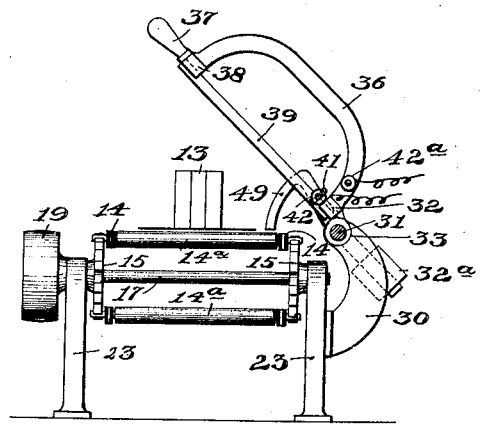

In the accompanying drawings, Figure 1 is a longitudinal vertical section of an ice-cream brick machine fitted with my improved slicing-machine. Fig. 2 is an end view of my slicing mechanism, and Fig. 3 is a plan view of the cutter-frame. Fig. 4 is a view similar to Fig. 2, showing a modification; and Fig. 5 is a plan of the said modification applied to the conveyer.

My invention, generally stated, consists in certain new and useful improvements in mechanism for slicing or cutting into sections icecream or other frozen material. Many devices have been gotten up for this purpose; but owing to the tendency of the material to adhere to the cutting member the same have always produced an uneven surface, which presents an undesirable appearance unless afterward smoothed and finished. By heating my cutting or slicing member or members I am enabled to produce an even smooth line of severance which needs no after finishing. I also show new and improved means for horizontal motion of the slicing-frame, by means of which I prevent the backing of the material against the same and the consequent distortion of the brick.

The following is a detailed description of the accompanying drawings, which illustrate means for carrying out the principles of my invention, but are not intended to limit the scope thereof to the construction shown therein. Fig. 1 shows an ice-cream machine in which 1 is a hopper leading into the chamber 2, in which revolves web-conveyer 3, provided at one end with shaft 4, which is journaled in the end wall of chamber 2, protruding through the same. The outer extremity of said shaft 4 is provided with power-pulley 5 or other suitable means for applying rotation thereto. If two or more chambers 2 2 are provided for the manufacture of layer-cream, on the shaft 4 of the central chamber 2 I also mount gear-wheel 6 for the transmission of power to the web-conveyers in the other chambers, as set forth and explained in my patent application, filed May 16, 1904, Serial No. 208,110. The other extremity of said conveyer 3, shaft 7, is journaled in cross-rib 8 in the forward end of chamber 2. 9 is the reducing-chamber, and 10 is the mouth-piece attached to said reducing-chamber by insulating-joint 11, so that the walls of said mouthpiece may be heated for the ready discharge of the frozen cream without heating the walls of the reducing-chamber. The above mechanism, as already stated, is the subject of an application for a patent by me filed May 16, 1904. 12 is an endless conveyer of any suitable form adapted to receive the product as it issues from the mouth-piece of the brick-machine in the form of the slab 13, said conveyer being intended to carry the said product away as it issues from said mouthpiece. Said conveyer consists of two sprocket-chains 14' 14, between which are journaled the rollers 14ᵃ 14ᵃ and which work on pairs of sprocket-wheels 15 15 and 16 16, which are respectively mounted on shafts 17 and 18. One of said shafts, such as 17, is prolonged at one extremity and provided with a power-pulley 19. 20 is a roll of oil or other suitable paper mounted on shaft 21, suitably supported by means (not shown) from the conveyer-table. 22 is a guide-roller supported in a similar manner, over which the paper from roll 20 is led onto the conveyer 12, said paper being preferably of greater width than the product 13, so that it may be turned up laterally to enwrap the same. 23 is the frame of the conveyer 12, preferably mounted on wheels 24 24, which are adapted to run on track 25. 26 is a rod passing through apertures in the cross-braces 27 27 of the conveyer-table 23. 28 is a fixed standard, through an aperture in the upper part of which said rod 26 passes, and 29 is a spring coiled about said rod between the standard 28 and the forward cross-brace 27 of the table 23, so that table 23 is normally held in position shown in Fig. 1 by the force of said spring, but may be moved toward the right by sufficient force to compress said spring. 30 30 are rigid arms extending upwardly from one side of table 23, between which arms is supported rod 31. 32 is a second rod or member with ears or projections 33 33, which are pierced horizontally at 34 34 for mounting said ears on rod 31, whereby said rod 32 is pivoted on rod 31. 36 is an arched arm, shown integral with rod 32, but which may be removably attached thereto, if desired, and which is fitted at its other extremity with insulated hand-grasp 37. 38 is a rigid member attached to arm 36 adjacent to its free end and parallel with rod 32. 39 39 represent a plurality of cutting-blades or other severing members which at one end are fixed, preferably removably, in member 38, as by being secured in slots therein or in any other convenient manner. The other extremities are fixed, preferably removably, in insulating-blocks 40 40, secured to rod 32. It is evident that said knives are in electrical connection with member 38, but insulated from rod 32. It will be seen that I have thus provided a cutting-frame carrying slicing-blades and capable of being swung vertically across the path of the conveyer 12. 32ª is a weight-lever device to counterbalance said frame and keep it normally in its raised position out of engagement with the product 13 on conveyer 12. Thus if the frame be released after being depressed to sever the product 13 it will by means of said counterbalance swing of itself into its raised position. 41 is a member conveniently made in form of a blade notched to rest across the cutting-blades 39 39, and thus connect them electrically, and provided at one end with a threaded portion to be engaged by nut 42 for attachment of an electrical conductor. 43 is an electric battery or other source of current, in one of whose connecting-wires 44 is interposed a switch 45, which wire is attached to arm 36 by means of nut 42ª. The other wire of said battery, 46, is provided with a rheostat 47 or other convenient means to regulate the current and is electrically connected by any convenient means to blade 41 by means of nut 42. It will thus be seen that the knives 39 39 form a part of an electrical circuit which may be made or broken by means of switch 45 and the intensity of whose current may be regulated by rheostat 47. By forming the blades 39 39 of soft steel or other material of relatively high resistance to the passage of a current I am enabled to heat said blades and maintain them at any desired temperature. It is evident that by heating my slicing-blades a clean even cut may be made, and the frozen product will not adhere to the blade, as when a cold cutting member is used. However, if the knives 39 39 are permitted simply a vertical movement it is evident that in slicing the continuously-moving product 13 the product would back up against the blades while the slicing process is in progress, thus making an uneven cut. It is desirable, therefore, to give the cutting-frame a lateral movement during the slicing operation and until the blades are lifted again out of contact with the product to obtain a vertical cut. In the form of mechanism shown in Figs. 1, 2, and 3 I have shown the table mounted on wheels, as shown and described. I so regulate the strength and tension of spring 29 so that the pressure of the product against the blades 39 39 while the same are in contact therewith is sufficient to overcome the force of said spring, allowing the table 23 to move in the direction of the movement of the product 13, thus maintaining the blades in the same vertical plane as the line of severance through the product. When the cutting-frame is released, the counterbalance will throw the same into its raised position out of contact with the product 13, and thus allowing the spring 29 to throw the table 23 back into the position shown in Fig. 1. As the sliced product passes beyond the zone of movement of the cutting-frame the paper which has been sliced at the same time is turned up laterally, its excess width serving to enwrap the sides of the slices. It is evident that but one slicing member or blade 39 may be used, if desired, and the same depressed at proper intervals to sever the length of sections desired, or any number of blades may be provided, the cutting-frame being proportioned to accommodate the same, so that sections or slices of any desired size and number may be produced at one movement of the frame.

Figure 5:
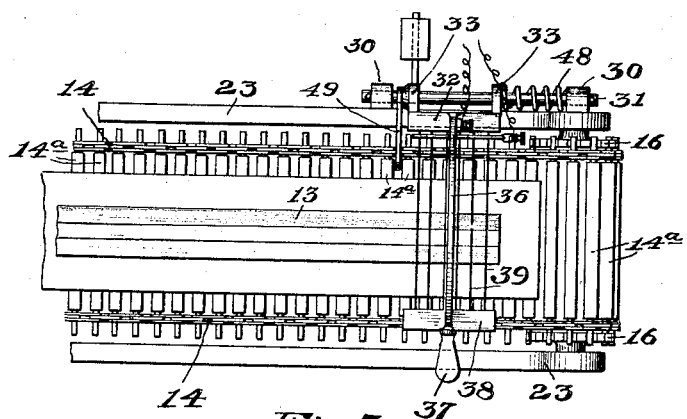

In Figs. 4 and 5 I show a modification of the mechanism whereby I secure horizontal movement for the cutting-frame during the period in which the blades are in contact with the product 13. In this case I provide a table 23, which is fixed to the floor and not provided with wheels. I also provide a greater distance between arms 30 30, thus prolonging rod 31. The ears 33, integral or otherwise rigid with rod 32, are loosely mounted, as before, on said rod 31, so that the frame may not only be swung up and down on rod 31 as a pivot, but may be slid along the same to give a horizontal movement to the frame. 48 is a coiled spring mounted on rod 31 between one of the ears 32 farthest away from the brick-machine and the adjacent arm 30. It will be seen that normally the frame will be held in the position shown in Fig. 5; but if sufficient force is exerted against spring 48 the frame may be moved to the right. 49 is a downwardly-extending arm, preferably curved, as shown, fixed to the cutting-frame, as to ear 38. The length of said arm 49 is such that when the cutting-frame is depressed the lower end of said arm enters between adjacent rollers 14ª 14ª just before the blades 39 39 strike the product to be severed. It is evident that when such engagement takes place the cutting-frame is drawn to the right along rod 31, imparting a horizontal motion thereto equal in rate to the movement of the product 13 on the conveyer 12. It will thus be seen that a smooth vertical cut will be made. Such horizontal movement will be continued after the cutting-frame is released from its depression and rises sufficiently to allow the blades to clear the product 13 and the arm 49 to rise from engagement between said rollers 14ᵃ 14ᵃ, when the spring 48 will throw said frame back again toward the left into the position shown in Fig. 5.

I have described two satisfactory methods of securing the desired horizontal movement of the cutting-frame; but it is evident that to one skilled in the art various other methods will present themselves to obtain the same results which I regard as equivalents of the means shown and as included within the purview of my invention. I have shown blades used to act as cutting members; but it is evident that wires or other substitutes may be used. I have also shown electrical means for heating my cutting members; but it is evident that other means for raising and maintaining the temperature of the cutting members may be substituted, if desired. I have also shown my cutting-machine as adapted for use by hand-power; but it is evident that the same may be arranged to be worked by power of any kind and the cutting-frame to be depressed, if desired, at intervals regulated by the size of sections to be severed. I have shown a well-known form of conveyer; but it is evident that any convenient type may be substituted or other means for carrying away the product after slicing may be used. The temperature to which I raise the cutting members varies as the degree of solidity of the product. It is only necessary to heat the blades sufficiently to avoid the adhering of the product thereto and leave a smooth severed surface. I have shown the blades 39 39 transverse to the product; but, if desired, they may be arranged to cut longitudinally thereof or both longitudinally and transverse, as may be desired.

Although for the sake of [clearness I have minutely described the illustrated embodiment of the principles of my invention, I do not wish to limit myself thereby; but

I claim broadly—

1. In slicing mechanism, a table, an endless conveyer mounted on said table, a shearing member mounted on said table and adapted to be swung transversely thereto, means for advancing said shearing member in the line of movement of said conveyer, spring-actuated means for returning said shearing member to its normal position and an electric circuit in which said shearing member is a part, substantially as and for the purposes set forth.

2. In slicing mechanism, an endless conveyer, means for discharging the material to be sliced upon said conveyer, a frame adapted to be swung transversely to said conveyer, combined means for slicing and smoothing the sliced surface of said material said means being mounted in said frame and means for heating said slicing and smoothing means, substantially as described.

Signed at Pittsburg, Pennsylvania, this 17th day of February, 1905.

JOHN J. GLAUSER.

Witnesses:
J. H. HARRISON,
EDWARD A. LAWRENCE.